US009454819B1

(12) United States Patent
Seetharaman et al.

(10) Patent No.: US 9,454,819 B1
(45) Date of Patent: Sep. 27, 2016

(54) SYSTEM AND METHOD FOR STATIC AND MOVING OBJECT DETECTION

(71) Applicant: THE UNITED STATES OF AMERICA AS REPRESETNED BY THE SECRETARY OF THE AIR FORCE, Washington, DC (US)

(72) Inventors: Gunasekaran Seetharaman, Alexandria, VA (US); Kannappan Palaniappan, Columbia, MO (US); Filiz Bunyak Ersoy, Columbia, MO (US); Rui Wang, Guangzhou (CH)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/795,953

(22) Filed: Jul. 10, 2015

Related U.S. Application Data

(60) Provisional application No. 62/170,185, filed on Jun. 3, 2015.

(51) Int. Cl.
*G06K 9/00* (2006.01)
*G06T 7/00* (2006.01)
*G06T 7/20* (2006.01)
*G06T 7/40* (2006.01)

(52) U.S. Cl.
CPC .......... *G06T 7/0042* (2013.01); *G06T 7/0051* (2013.01); *G06T 7/0085* (2013.01); *G06T 7/2006* (2013.01); *G06T 7/40* (2013.01); *G06T 2207/10016* (2013.01)

(58) Field of Classification Search
None
See application file for complete search history.

(56) References Cited

U.S. PATENT DOCUMENTS

| 2005/0271273 | A1* | 12/2005 | Blake | G06K 9/00624 382/173 |
| 2007/0183662 | A1* | 8/2007 | Wang | G06K 9/00248 382/173 |
| 2015/0139484 | A1* | 5/2015 | Wu | G06K 9/00624 382/103 |
| 2015/0334398 | A1* | 11/2015 | Socek | H04N 19/146 375/240.26 |

OTHER PUBLICATIONS

Bouwmans et al (NPL: "Background Modeling using Mixture of Gaussians for Foreground Detection" hal-00338206, 2008, p. 20).*

* cited by examiner

*Primary Examiner* — Bhavesh Mehta
*Assistant Examiner* — Oneal R Mistry
(74) *Attorney, Agent, or Firm* — Joseph A Mancini

(57) ABSTRACT

A method for static and moving object detection employing a motion computation method based on spatio-temporal tensor formulation, a foreground and background modeling method, and a multi-cue appearance comparison method. The invention operates in the presence of shadows, illumination changes, dynamic background, and both stopped and removed objects.

18 Claims, 7 Drawing Sheets

|  | Recall | Spec | FPR | FNR | PWC | F | Prec |
|---|---|---|---|---|---|---|---|
| KNN[14] | 0.6650 | 0.9802 | 0.0198 | 0.3350 | 3.3200 | 0.5937 | 0.6788 |
| GMM1[12] | 0.6846 | 0.9750 | 0.0250 | 0.3154 | 3.7667 | 0.5707 | 0.6025 |
| KDE[5] | 0.7375 | 0.9519 | 0.0481 | 0.2625 | 5.6262 | 0.5688 | 0.5811 |
| MahaD[2] | 0.1644 | 0.9931 | 0.0069 | 0.8356 | 3.4750 | 0.2267 | 0.7403 |
| GMM2[13] | 0.6604 | 0.9725 | 0.0275 | 0.3396 | 3.9953 | 0.5566 | 0.5973 |
| EucD[2] | 0.6803 | 0.9449 | 0.0551 | 0.3197 | 6.5423 | 0.5161 | 0.5480 |
| FTSG | 0.7657 | 0.9922 | 0.0078 | 0.2343 | 1.9763 | 0.7283 | 0.7696 |

FIGURE 6

| | Recall | Spec | FPR | FNR | PWC | F | Prec |
|---|---|---|---|---|---|---|---|
| Bad Weather | 0.7457 | 0.9991 | 0.0009 | 0.2543 | 0.5109 | 0.8228 | 0.9231 |
| Low Framerate | 0.7517 | 0.9963 | 0.0037 | 0.2483 | 1.1823 | 0.6259 | 0.6550 |
| Night Videos | 0.6107 | 0.9759 | 0.0241 | 0.3893 | 4.0052 | 0.5130 | 0.4904 |
| PTZ | 0.6730 | 0.9770 | 0.0230 | 0.3270 | 2.5519 | 0.3241 | 0.2861 |
| Turbulence | 0.6109 | 0.9998 | 0.0002 | 0.3891 | 0.1987 | 0.7127 | 0.9035 |
| Baseline | 0.9513 | 0.9975 | 0.0025 | 0.0487 | 0.4766 | 0.9330 | 0.9170 |
| Dynamic Background | 0.8691 | 0.9993 | 0.0007 | 0.1309 | 0.1887 | 0.8792 | 0.9129 |
| Camera Jitter | 0.7717 | 0.9866 | 0.0134 | 0.2283 | 2.0787 | 0.7513 | 0.7645 |
| Intermittent Object | 0.7813 | 0.9950 | 0.0050 | 0.2187 | 1.6329 | 0.7891 | 0.8512 |
| Shadow | 0.9214 | 0.9918 | 0.0082 | 0.0786 | 1.1305 | 0.8832 | 0.8535 |
| Thermal | 0.7357 | 0.9960 | 0.0040 | 0.2643 | 1.1823 | 0.7768 | 0.9088 |
| Overall | 0.7657 | 0.9922 | 0.0078 | 0.2343 | 1.3763 | 0.7283 | 0.7696 |

FIGURE 7

SYSTEM AND METHOD FOR STATIC AND MOVING OBJECT DETECTION

STATEMENT OF GOVERNMENT INTEREST

The invention described herein may be manufactured and used by or for the Government for governmental purposes without the payment of any royalty thereon.

BACKGROUND OF THE INVENTION

In real world monitoring applications, moving object detection remains to be a challenging task due to factors such as background complexity, illumination variations, noise, and occlusions. As a fundamental first step in many computer vision applications such as object tracking, behavior understanding, object or event recognition, and automated video surveillance, various motion detection algorithms have been developed ranging from simple approaches to more sophisticated ones [11].

OBJECTS AND SUMMARY OF THE INVENTION

The present invention comprises a novel hybrid moving object detection system and method that uses motion, change, and appearance information for more reliable detections over the prior art. The main features of the invention are: (i) A motion computation method based on spatiotemporal tensor formulation named flux tensor; (ii) A novel split Gaussian method to separately model foreground and background; (iii) A robust multi-cue appearance comparison module to remove false detections due to illumination changes, shadows etc. and to differentiate stopped objects from revealed background by removed objects. The invention can handle shadow, illumination changes, ghosts, stopped or removed objects, some dynamic background and camera jitter while still maintaining a fast boot-strapping. The invention outperforms most well-known prior art techniques on moving object detection.

Previous methods employing flux tensor models alone work well if there is motion in the video. So if a person or object is moving then the flux tensor will work. But if the person or object stops (or moves very slowly) then the flux tensor will not be able to detect the object. [10]

The present invention FTSG (Flux Tensor with Split Gaussian models) is able to detect moving objects that become stationary and stop. Other patented and published methods would also fail in this situation as after some time period depending on an update or learning parameter, the stopped object would be considered as part of the background and not be detected any further, i.e. it would "disappear" into the background as it is no longer moving. This is a similar situation to a person who walks into a room and sits down in a couch. Initially the person would be detected by flux and other methods. But after varying time periods ranging from a few tenths of a second to a few seconds or longer depending on the update parameter the flux and other competitive methods would then classify the sitting person as background and no longer be able to detect the person until they start to move again.

The present invention (FTSG) however is able to detect the person when they walk into the room and during the entire period that they are sitting in the chair stationary they are still detected accurately using the change detection model. This makes the present invention very robust. Additionally when a stationary object moves, the background behind the object is often misclassified as foreground or an object of interest in prior art methods. In the present invention the FTSG classifies this scenario by labeling these pixels in each video frame as a "revealed background". This gives more accurate information for providing alerts to an operator or for providing detections for a tracking algorithm that labels changed pixels as one of multiple categories including revealed background, shadow and so forth instead of only background and foreground.

The present invention is also able to properly handle dynamic backgrounds such as a fountain, waves, sun glint, illumination change, weather like rain, snow, and dust by filtering out this spurious motion. Most other prior art methods (including those relying on the flux tensor methods alone) would respond to these environmental changes as "foreground motion" and falsely identify many pixels as being important. In reality if we are tracking a person walking in rain or skating in snow we only want the output of the method to indicate the pixels where the person is located. The present invention is capable of distinguishing between background environmental changes that induce false motion from the true motion of foreground objects/targets of interest.

The present invention uses a split Gaussian representation to model the foreground and background that is based on two separate probability models—one for the object appearance and a separate probability model for the changing background. The split Gaussian is different from the commonly used approach of a single Mixture of Gaussians (MOG) or Gaussian Mixture Model (GMM) to model both the foreground and background used by other static and moving object detection methods. Although a single mixture of Gaussians can be used for the foreground-background model, the split Gaussian is more flexible and provides better overall video change detection performance.

The present invention incorporates a method for automatic learning of parameters for each pixel or region in the image that is not hard-coded or predetermined, but adaptive to the specific video being analyzed and the spatiotemporal context of the object being tracked. This significantly reduces the number of parameters that needs to be manually specified and increases detection accuracy due to automatic parameter adaptation. For example, the number of Gaussians. K, for any given pixel in the split Gaussian background model is not fixed a priori but is updated on every frame as new information about the scene is observed and measured in the video.

The present invention associates a semantic label with each pixel that is identified as having changed in the scene using a combination of processing algorithms including information provided by the flux tensor model, split gaussian model, appearance agreement with foreground model, blob size, and object based analysis. The semantic label processing enables categorizing changed pixels as being associated with six or more categories including a true moving object, stopped object, shadows and illumination change, static background, a revealed background when a stationary object moves, a dynamic background arising from constant motion such as a water fountain, or sun glint from the waves off a water surface.

The invention fuses two or more types of motion information at the pixel level by combining the flux tensor response jointly with the Gaussian mixture response to facilitate detection of both moving objects and those moving objects which have stopped or whose velocity has become very low. The invention can be extended to fuse other sources of information such as optical flow, texture information, shape information, or depth information.

The present invention can be applied to video taken by a moving camera, such as a camera mounted on an airplane or drone, after the sequence of video frames is registered and stabilized with respect to an internal or external reference system. A possible internal reference system is one or more base image frames from the video to which other nearby frames are registered, or with respect to an external reference system including a physical geospatial map of the indoor or outdoor scene.

It is therefore an object of the present invention to provide moving and stationary object detection with improved performance and accuracy over the prior art.

It is a further object of the present invention to provide a method for moving and stationary object detection that can discriminate between stationary objects and stationary background.

It is still a further object of the present invention is to provide a method for moving and stationary object detection that reduces false detections due to shadowing, illumination changes, background dynamics, and camera jitter.

Briefly stated, the present invention achieves these and other objects through a method for static and moving object detection employing a motion computation method based on spatio-temporal tensor formulation, a foreground and background modeling method, and a multi-cue appearance comparison method. The invention operates in the presence of shadows, illumination changes, dynamic background, and both stopped and removed objects.

According to an embodiment of the invention, a method for static and moving object detection from a source of video images, pixel-level motion from said video images is detected where the detection comprises performing motion segmentation and performing background subtraction, where background subtraction further comprises modeling image background and modeling image foreground separately from each other, and where background modeling comprises an adaptive plurality of Gaussians; fusing the results of motion segmentation, background modeling, and foreground modeling so as to identify moving foreground objects and static foreground objects; and discriminating among static foreground objects so as to classify them as either stopped objects or background.

The above and other objects, features and advantages of the present invention will become apparent from the following description read in conjunction with the accompanying drawings, in which like reference numerals designate the same elements.

REFERENCES

[1] O. Barnich and M. Van Droogenbroeck. Vibe: A universal background subtraction algorithm for video sequences. *IEEE Trans. Image Proc.*, 20(6):1709-1724, 2011.

[2] Y. Benezeth, P.-M. Jodoin, B. Emile, C. Rosenberger, and H. Laurent. Comparative study of background subtraction algorithms. *Journal ojf Electronic Imaging*, 19(3): 033003-033003-12, 2010.

[3] F. Bunyak, K. Palaniappan, S. K. Nath, and G. Seetharaman. Flux tensor constrained geodesic active contours with sensor fusion for persistent object tracking. *Journal of Multimedia*, 2(4):20, 2007.

[4] F. Bunyak, K. Palaniappan, S. K. Nath, and G. Seetharaman. Geodesic active contour based fusion of visible and infrared video for persistent object tracking. In *IEEE Workshop Applications of Computer Vision* (WA CV), 2007.

[5] A. Elgammal, D. Harwood, and L. Davis. Nonparametric model for background subtraction. In *European Conf. Comp. Vision*. Springer. 2000.

[6] R. H. Evangelio and T. Sikora. Complementary background models for the detection of static and moving objects in crowded environments. In *IEEE Int. Conf. Advanced Video Signal-Based Surveillance*, 2011.

[7] N. Goyette, P. Jodoin, F. Porikli, J. Konrad, and P. Ishwar. Changedetection.net: A new change detection benchmark dataset. In *IEEE Conf. Comp. Vision Pattern Recog. Workshops*, pages 1-8, 2012.

[8] K. Palaniappan, F. Bunyak, S. Nath, and J. Goffeney. Parallel processing strategies for cell motility and shape analysis. In *High-Throughput Image Reconstruction and Analysis*, pages 39-87. Artech House Publishers, 2009.

[9] K. Palaniappan, I. Ersoy, and S. K. Nath. Moving object segmentation using the flux tensor for biological video microscopy. *Lecture Notes in Computer Science* (PCM), 4810:483-493, 2007.

[10] K. Palaniappan, I. Ersoy, G. Seetharaman, S. Davis, P. Kumar, R. M. Rao, and R. Linderman. Parallel flux tensor analysis for efficient moving object detection. In 14*th Int. Conf. Information Fusion,* 2011.

[11] R. Radke, S. Andra, O. Al-Kofahi, and B. Roysam. Image change detection algorithms: a systematic survey. *IEEE Trans. Image Proc.,* 14(3):294-307, 2005.

[12] C. Stauffer and W. E. L. Grimson. Adaptive background mixture models for real-time tracking. In *IEEE Conf Comp. Vision Pattern Recog.*, volume 2, 1999.

[13] Z. Zivkovic. Improved adaptive gaussian mixture model for background subtraction. In *Int. Conf Pattern Recog.*, volume 2, 2004.

[14] Z. Zivkovic and F. van der Heijden. Efficient adaptive density estimation per image pixel for the task of background subtraction. *Pattern Recogn. Lett.*, 27(7):773-780, May 2006.

BRIEF DESCRIPTION OF THE DRAWINGS

FIG. 6 depicts a quantitative comparison of results from six state-of-the-art change detection algorithms versus the present invention's Flux Tensor Split Gaussian (FTSG) method.

FIG. 7 depicts the performance of the present invention's Flux Tensor Split Gaussian (FTSG) method for a eleven scenarios for all seven performance measures.

DETAILED DESCRIPTION OF THE PREFERRED EMBODIMENT

Figure 1:
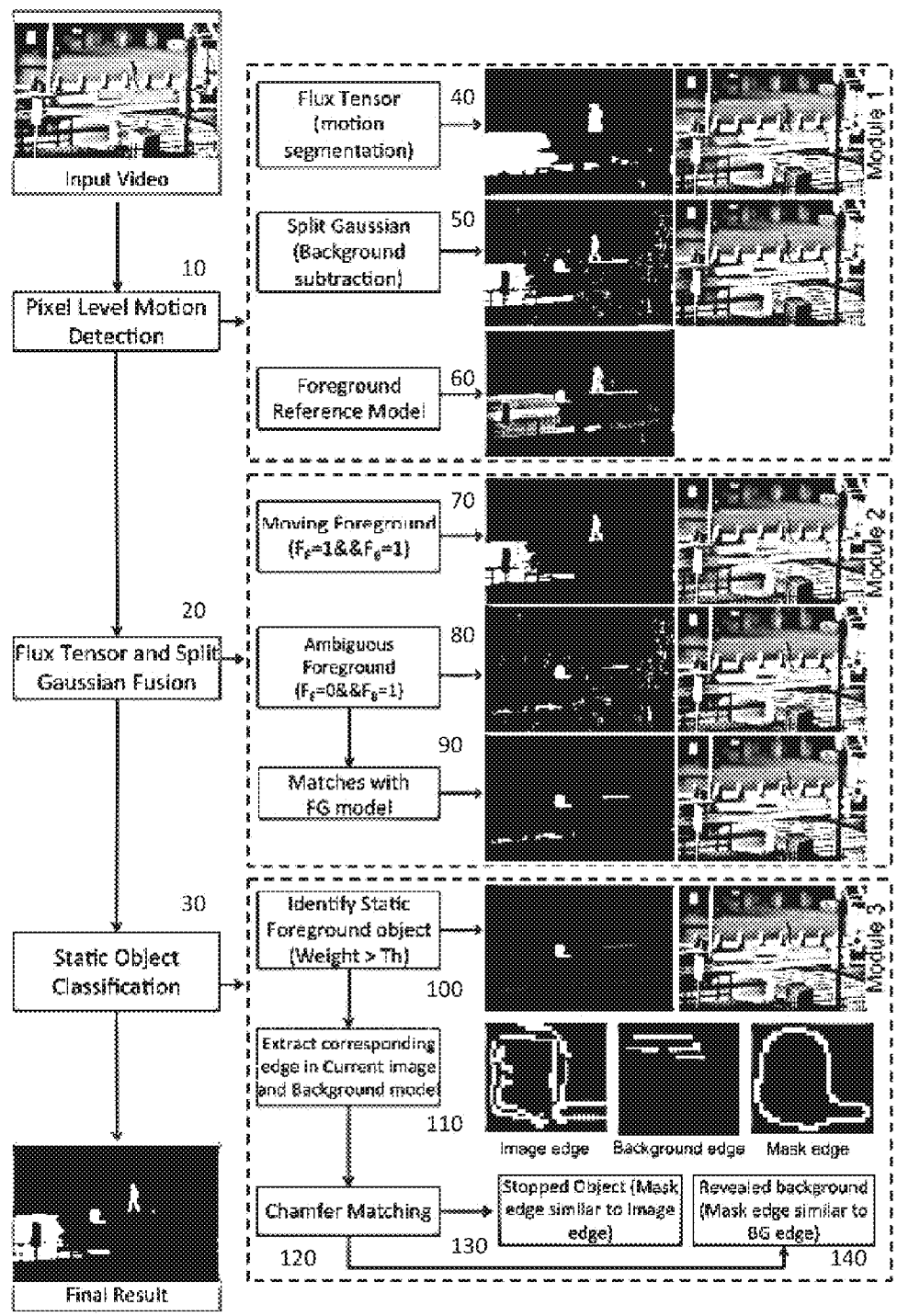
FIG. 1 depicts a system flow diagram for three primary modules comprising the present invention's static and moving object detection using flux tensor with split Gaussian models.

Referring to FIG. 1 depicts the present invention's system flow diagram. Flux Tensor with Split Gaussian models (FTSG) consists of three main modules described below:

a) Pixel level motion detection module 10: two complementary methods, flux tensor based motion detection 40 and split Gaussian models 50 based background subtraction, run separately on input images and produce foreground detection results.

b) Fusion module 20: flux tensor based 40 and split Gaussian based detection results are fused using a rule-based system 70, 80, 90 to produce improved results that reduce errors due to noise, illumination changes, and halo effects.

c) Object level classification module 30: removed and stopped objects are handled. Edges of the static objects in foreground detection mask 100 are compared to the edges of the corresponding object in current image and background 110 model using chamfer matching 120. Detailed descriptions of each component are given in the following sections.

Flux Tensor Based Motion Detection

Motion blob detection is performed using multichannel version of flux tensor method 40 [3] which is an extension to 3D grayscale structure tensor. Using flux tensor 40, motion information can be directly computed without expensive eigenvalue decompositions. Flux tensor 40 represents the temporal variation of the optical flow field within the local 3D spatiotemporal volume. In expanded matrix form, flux tensor 40 is written as:

$$J_F = \begin{bmatrix} \int_\Omega \left\{\frac{\partial^2 I}{\partial x \partial t}\right\}^2 dy & \int_\Omega \frac{\partial^2 I}{\partial x \partial t}\frac{\partial^2 I}{\partial y \partial t} dy & \int_\Omega \frac{\partial^2 I}{\partial x \partial t}\frac{\partial^2 I}{\partial t^2} dy \\ \int_\Omega \frac{\partial^2 I}{\partial y \partial t}\frac{\partial^2 I}{\partial x \partial t} dy & \int_\Omega \left\{\frac{\partial^2 I}{\partial y \partial t}\right\}^2 dy & \int_\Omega \frac{\partial^2 I}{\partial y \partial t}\frac{\partial^2 I}{\partial t^2} dy \\ \int_\Omega \frac{\partial^2 I}{\partial t^2}\frac{\partial^2 I}{\partial x \partial t} dy & \int_\Omega \frac{\partial^2 I}{\partial t^2}\frac{\partial^2 I}{\partial y \partial t} dy & \int_\Omega \left\{\frac{\partial^2 I}{\partial t^2}\right\}^2 dy \end{bmatrix} \quad (1)$$

The elements of the flux tensor 40 incorporate information about temporal gradient changes which leads to efficient discrimination between stationary and moving image features. Thus the trace of the flux tensor 40 matrix which can be compactly written and computed as, $$\mathrm{trace}(J_F) = \int_\Omega \left\|\frac{\partial}{\partial t}\nabla I\right\|^2 dy \quad (2)$$

can be directly used to classify moving and non-moving regions without eigenvalue decompositions. Flux tensor 40 based moving object detection has been successfully used in both surveillance [4, 10] and biomedical video analysis applications [9, 8].

Split Gaussian Models

Gaussian models have been widely used in background subtraction methods. Mixture of Gaussians can efficiently represent multimodal signals, which makes them suitable for background modeling and subtraction. We adopt mixture of Gaussians as our background model. However, unlike MoG in [12] where background and foreground are blended together into a single model with fixed number of Gaussians, we model foreground and background separately, and use adaptively changing number of Gaussians for the background model 50. This simplifies the background/foreground classification step 30, prevents background model 50 from being corrupted by foreground pixels, and also provides better adaptation for different background types (static vs. dynamic backgrounds). This approach has fast bootstrapping, adaptive updating and complex background environment modeling capabilities. Background model: We use a mixture of K Gaussians to model the background where K is a spatially and temporally adaptive variable. Every new pixel value, $I_t(x, y)$, is checked against the existing K Gaussian distributions. A match to a Gaussian is defined as pixel values within Tb standard deviations of the mean:

$$D_{min}(x, y) = \min_{i \in K}\max_{j \in C}((I_t(x, y) - \mu_{i,j})^2 - T_b \cdot \sigma^2) \quad (3)$$

A pixel is labeled as foreground if it does not match any of the Gaussians in the background model:

$$F_B(x, y) = \begin{cases} 1, & \text{if } D_{min}(x, y) > 0 \\ 0, & \text{otherwise} \end{cases} \quad (4)$$

$T_b$ is a fixed threshold and stands for number of standard deviations, and $$\sigma = \sum_i^k \omega_i \sigma_i.$$

For each pixel, there will be K×C Gaussian models where C is the number of channels, e.g. 3 for RGB. For simplicity, all the channels share the same variance σ and weight ω.

Foreground appearance (reference) model 60: We use a single Gaussian to model the foreground. Foreground appearance model 60 (shown in FIG. 1, module 1) is used to distinguish static foreground (stopped object and revealed background) from spurious detections due to illumination changes and noise within ambiguous regions, $F_{amb}(x, y)$ where $F_F=0$ and $F_B=1$ (detected as background by flux but as foreground by background subtraction shown as ambiguous foreground 80 in FIG. 1 module 2).

Figure 2:
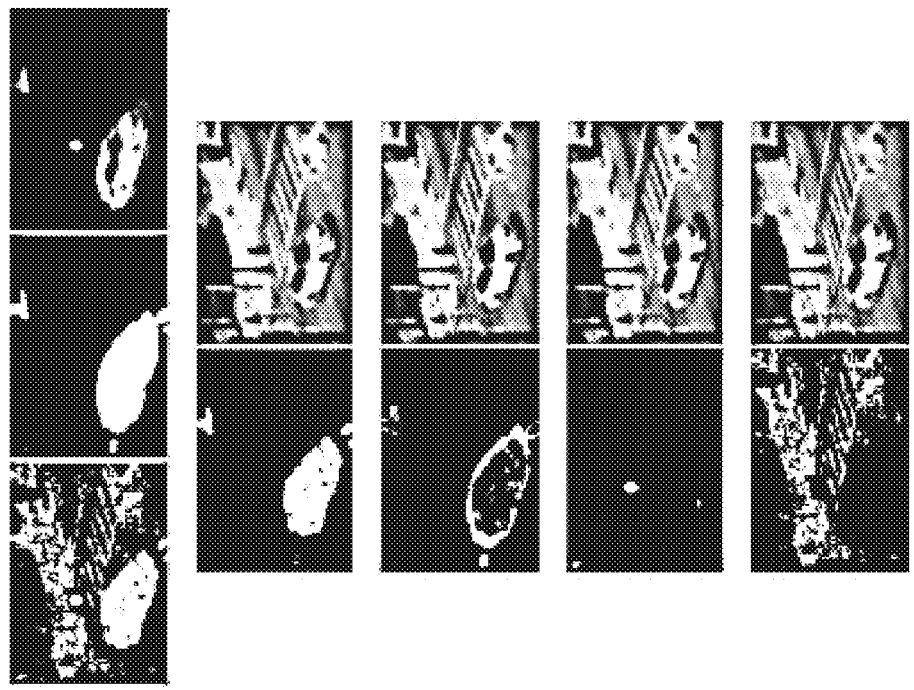
FIG. 2 depicts the fusion process of the flux tensor and split Gaussian models in the present invention.
Figure 2:
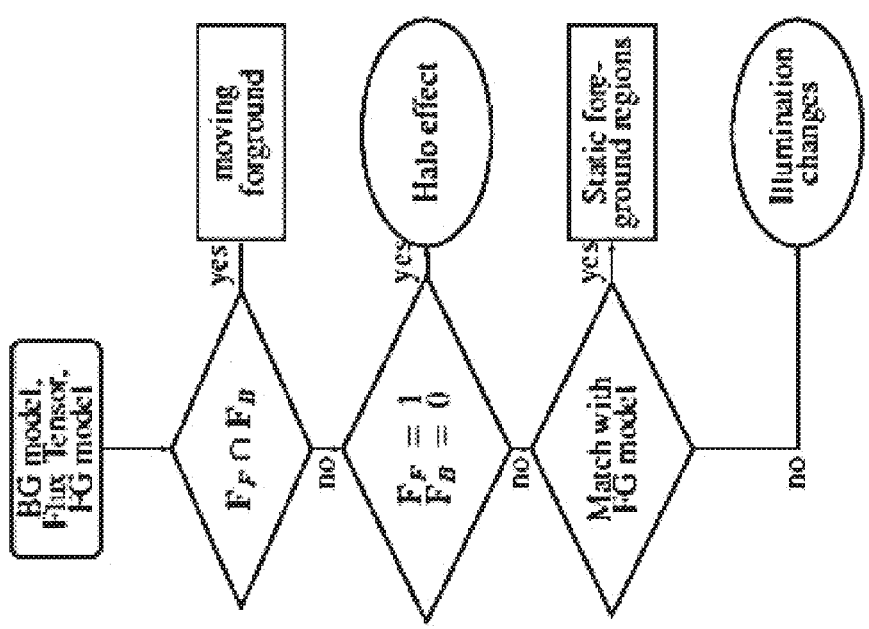

Referring to FIG. 2, static foreground regions $F_S$ are identified 100 within ambiguous detections $F_{amb}$ using foreground model:

$$F_S(x, y) = \begin{cases} 1, & \text{if } F_{amb}(x, y) = 1 \text{ and} \\ & I_t(x, y) - \mu_f(x, y) < T_f \\ 0, & \text{otherwise} \end{cases} \quad (5)$$

Model initialization: Flux tensor provides motion information, and the fusion and classification modules greatly reduce false positives. Therefore, the background model can be directly initialized using the first few frames and the foreground appearance model can be initialized to be empty. Background model update: Common background model update schemes can be classified as blind update or conservative update [1]. Blind update, such as in MoG [12], incorporates all sample values into the background model, while conservative update only incorporates sample values that are previously classified as background. The present invention uses the conservative update policy for both our background and foreground models. Fusion 70, 80, 90 and object classification modules 100, 110, 120, 130, 140 (see FIG. 1) considerably reduce potential deadlock problems in conservative update where temporary detection errors may become permanent ghosts. Static background and illumination changes are updated into the background model as:

$$\mu_t = (1-\alpha)M\mu_{t-1} + \alpha M I_t \quad (6)$$

$$\sigma_t^2 = (1-\alpha)M\sigma_{t-1}^2 + M\alpha(I_t-\mu)^T\alpha(I_t-\mu) \quad (7)$$

$$\omega_{i,t} = (1-\alpha)\omega_{i,t-1} + \alpha M \quad (8)$$

$$M = (1-F_B) \cup (F_{amb} - F_S) \quad (9)$$

where $\alpha$ is a fixed learning rate set to 0.004 and M stands for update mask. Background revealed by removed objects and dynamic background are incorporated to background model as new Gaussian distributions. A new Gaussian is initialized with a high variance and low weight, and its mean is set to the current pixel value. If there is a large persistent change, a new model will be added to each pixel (i.e. in PTZ scenario [7], camera field of view change triggers large persistent change). Existing Gaussian models with weights less than a threshold $T_l$ are discarded.

Foreground model update: As in the case of the background model, a conservative update strategy is used for the foreground model. Foreground model is only updated with the foreground regions indicated by the inverse of the background model update mask. In order to accommodate fast changing foreground, a high learning rate is used for foreground update.

Fusion of Flux Tensor and Split Gaussian Models

The goal of this decision fusion module is to exploit complementary information from two inherently different approaches to boost overall detection accuracy. Referring to FIG. 1, flux tensor based motion segmentation 40 produces spatially coherent results due to spatio-temporal integration. These results are also robust to illumination changes and soft shadows due to use of gradient based information. But since the method relies on motion, it fails to detect stopped foreground objects and tends to produce masks larger than the objects. Background subtraction 50 on the other hand can detect stopped objects, but is sensitive to noise, illumination changes and shadows. Here the present invention extends flux tensor based motion segmentation 40 with split Gaussian foreground and background models 50 to generate a more complete and accurate foreground object detection 60 method.

Referring to FIG. 2 shows fusion flow chart and some examples of flux tensor and split Gaussian model fusion (40, 50, FIG. 1) results. Pixels that are detected 150 as foreground by both flux tensor and split Gaussian background subtraction (40, 50, FIG. 1) are classified as moving foreground objects 180. Pixels that are detected 160, 170 as foreground by background subtraction only and have a match in foreground model correspond to static foreground objects 200.

Stopped and Removed Object Classification

Still referring to FIG. 2, the present invention classifies both stopped objects (true positives) and revealed background by removed objects (false positives) as static foreground (see 100, FIG. 1). Distinguishing these two types of static foreground can effectively reduce the false positive rate and tackle deadlock problem. The present invention's method used for removed and stopped objects classification (see 30, FIG. 1) is based on [6], which basically has three steps: 1. Identify pixels corresponding to static regions 100; 2. Perform edge detection on static regions in current image 110, background generated by background subtraction, and foreground detection mask 120; and 3. Perform classification based on edge matching 130, 140.

Figure 3:
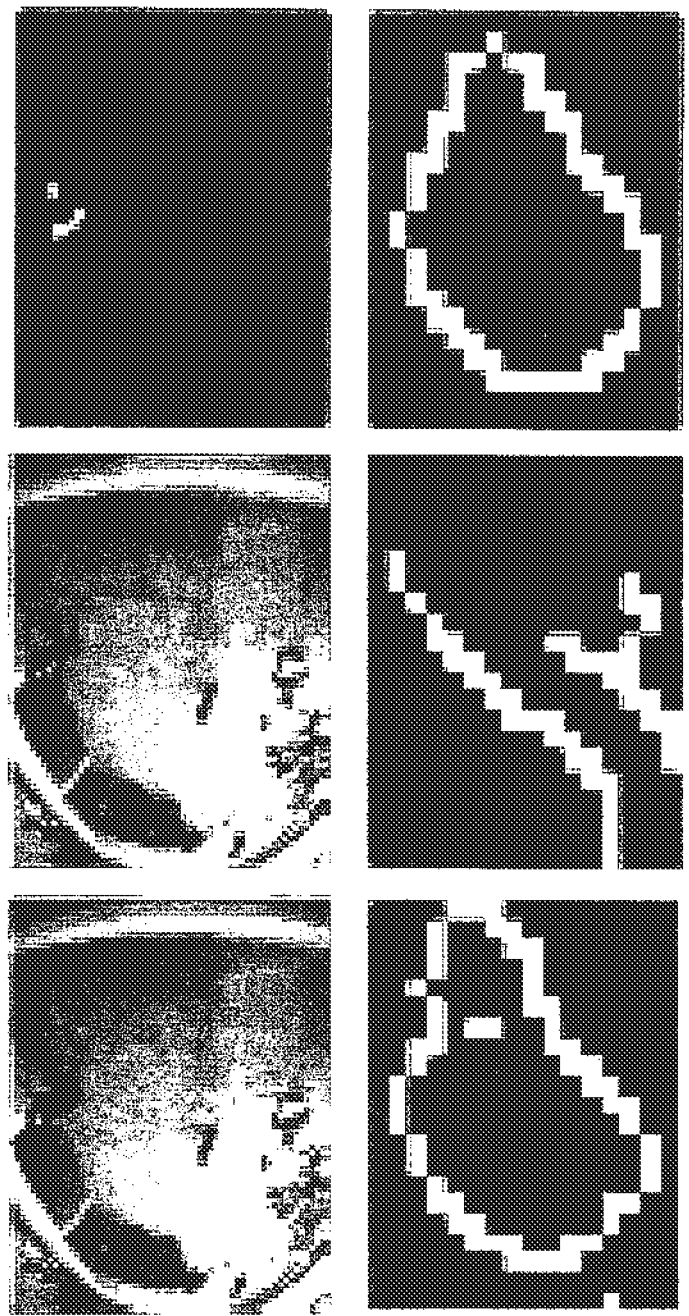
FIG. 3 depicts the classification of stopped objects corresponding and edge maps.
Figure 4:
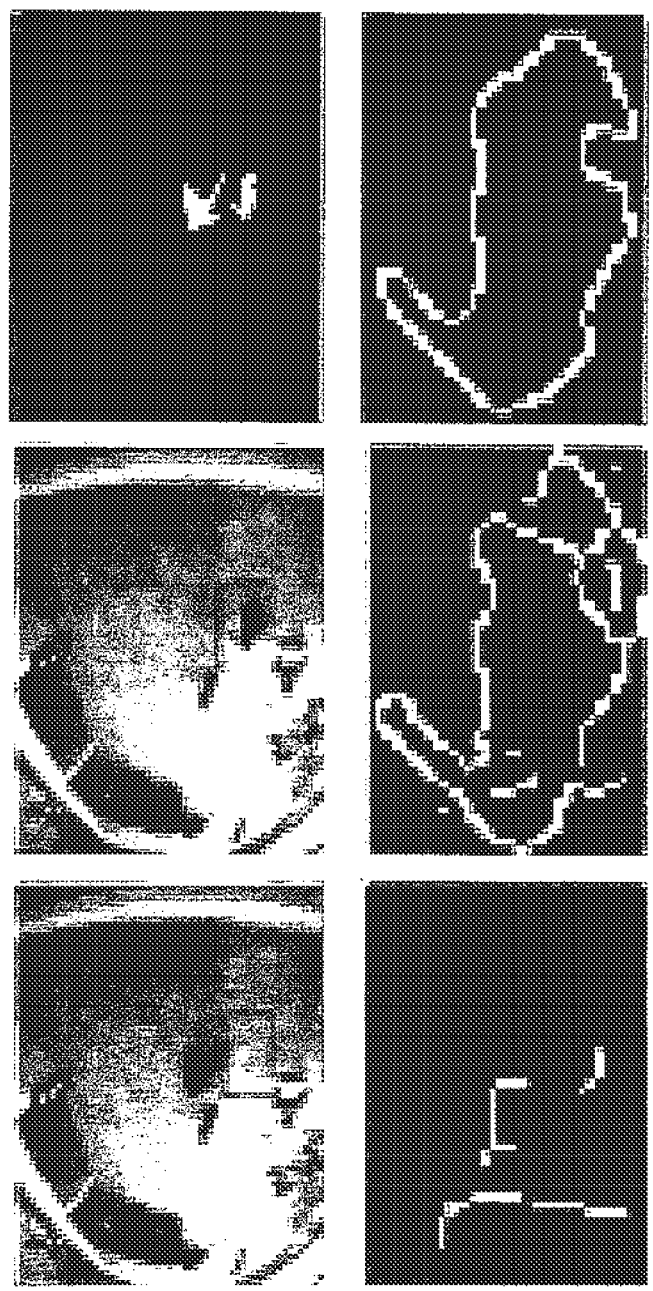
FIG. 4 depicts the classification of revealed background which is revealed by the removal of objects, and corresponding edge maps.

Referring to FIG. 3 and FIG. 4 show classification examples for stopped object (an abandoned bag) and revealed background by removed object (ghost effect due to background model initialization) respectively. Stopped object has higher edge similarity between current image and foreground mask, while revealed background by removed object has higher edge similarity between background model and foreground mask.

Results and Analysis

The proposed flux tensor with split Gaussian models system is evaluated using the dataset and evaluation metrics in CVPR 2014 Change Detection challenge [7]. One fixed set of parameters is used for all the sequences. The learning rate a is 0.004 for background model and 0.5 for foreground model. The matching threshold $T_b$ in Eq. 3 is 3 and the similarity matching threshold $T_f$ in Eq. 5 is 20. The threshold for flux tensor to segment moving foreground object from non-moving background is dynamically changing according to the number of Gaussians distributions at each pixel location. This avoids the use of a fixed global threshold unlike most other temporal differencing methods.

Referring to FIG. 6 shows the comparison result of present invention's FTSG methodology with other state-of-the-art change detection methods. Evaluation scores of those methods are obtained from http://www.changedetection.net. The best result of each metric is highlighted and in all the measures listed in FIG. 6. It can be seen that the present invention's FTSG methodology outperforms all the listed methods in five out of seven measures and has the second best score in the remaining two measures, specificity and FPR.

Referring to FIG. 7 shows results of the proposed approach on all eleven scenarios. On seven out of eleven scenarios and on the overall evaluation the present invention's FTSG methodology outperforms not only the listed state-of the-art methods but also the new change detection challenge submissions in terms of average ranking.

Figure 5:
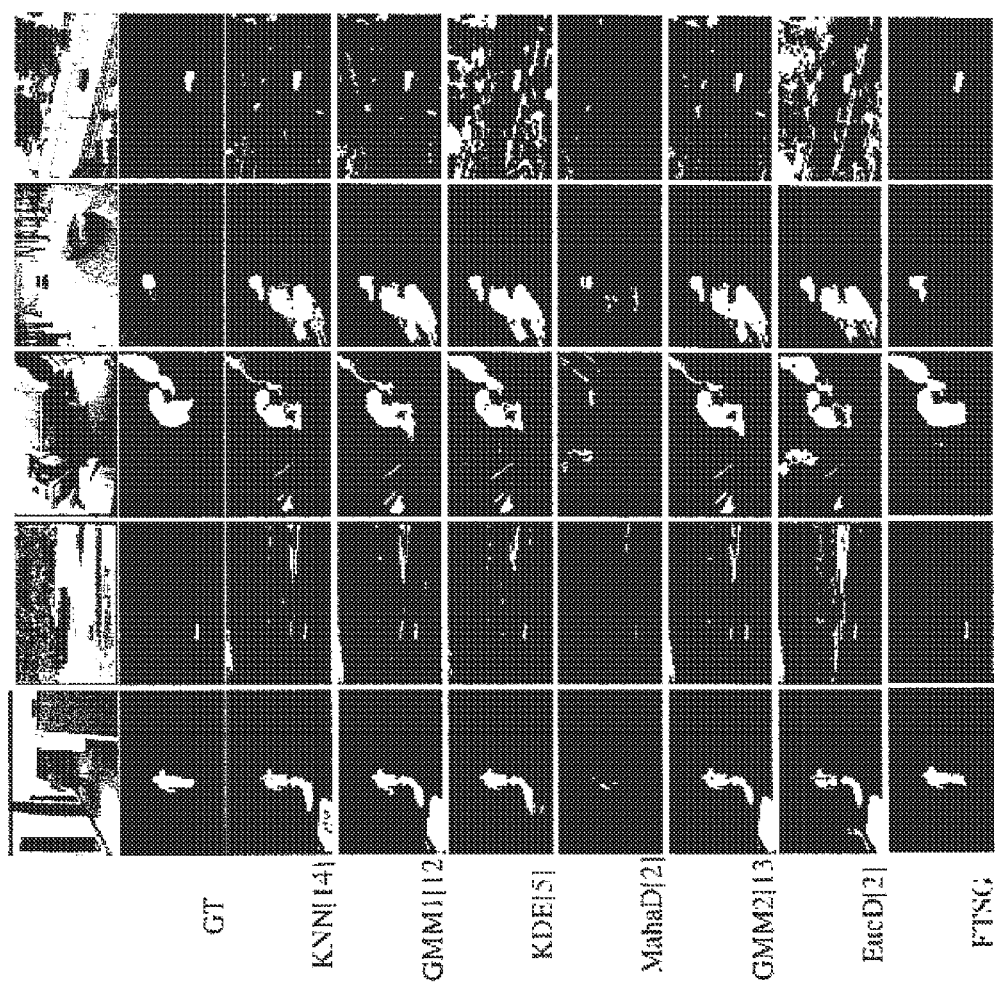
FIG. 5 depicts selected foreground detection results from six state-of-the-art change detection algorithms versus the present invention's Flux Tensor Split Gaussian (FTSG) method.

Referring to FIG. 5 shows moving object detection results for various algorithms including proposed Flux Tensor with Split Gaussian models (FTSG) on CVPR 2014 Change Detection dataset [7] with some typical frames selected from the 11 categories. The proposed FTSG is robust to illumination changes (col 1), it can detect long term static objects (col 3), and it also handles dynamic background (col 2). Image in col 4 demonstrates that FTSG can correctly identify revealed background by removed object, and image in col 5 shows that the present invention's FTSG methodology can adapt to scene changes quickly (sudden change of camera focus).

A simulation/prototype of the present invention implemented in Matlab runs at 10 fps for a 320×240 video. Matlab implementation of flux tensor only detection runs at 50 fps. flux tensor computation can be easily parallelized for different architectures as in [10] because of the fine grain parallelism of the filter operations.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for static and moving object detection from a source of video images, comprising the steps of:
   detecting pixel-level motion from said video images, wherein said detection further comprises the steps of:
      performing motion segmentation;
      performing background subtraction, wherein said background subtraction further comprises the steps of:
         modeling image background and modeling image foreground separately from each other, wherein said background modeling comprises an adaptive plurality of Gaussians;
   fusing results of said motion segmentation, said background modeling, and said foreground modeling so as to identify moving foreground objects and static foreground objects; and
   discriminating among said static foreground objects so as to classify them as either stopped objects or background.

2. The method of claim 1, wherein said step of motion segmentation further comprises the step of determining the temporal variation of an optical field flow within a local 3-dimensional spatiotemporal volume.

3. The method of claim 2, wherein said step of determining said temporal variation further comprises:
   computing a flux tensor matrix represented by $$J_F = \begin{bmatrix} \int_\Omega \left\{\frac{\partial^2 I}{\partial x \partial t}\right\}^2 dy & \int_\Omega \frac{\partial^2 I}{\partial x \partial t}\frac{\partial^2 I}{\partial y \partial t} dy & \int_\Omega \frac{\partial^2 I}{\partial x \partial t}\frac{\partial^2 I}{\partial t^2} dy \\ \int_\Omega \frac{\partial^2 I}{\partial y \partial t}\frac{\partial^2 I}{\partial x \partial t} dy & \int_\Omega \left\{\frac{\partial^2 I}{\partial y \partial t}\right\}^2 dy & \int_\Omega \frac{\partial^2 I}{\partial y \partial t}\frac{\partial^2 I}{\partial t^2} dy \\ \int_\Omega \frac{\partial^2 I}{\partial t^2}\frac{\partial^2 I}{\partial x \partial t} dy & \int_\Omega \frac{\partial^2 I}{\partial t^2}\frac{\partial^2 I}{\partial y \partial t} dy & \int_\Omega \left\{\frac{\partial^2 I}{\partial t^2}\right\}^2 dy \end{bmatrix}$$

and computing a trace of said flux tensor matrix represented by $$\text{trace}(J_F) = \int_\Omega \left\|\frac{\partial}{\partial t}\nabla I\right\|^2 dy$$

where I represents pixel intensity.

4. The method of claim 1, wherein said step of image background modeling further comprises the steps of:
   comparing pixel values against a plurality of Gaussians; and
   determining a pixel match, wherein a pixel match is defined as pixel values falling within a predetermined number of standard deviations from a mean value.

5. The method of claim 4, wherein said mean value is determined by $$D_{min}(x, y) = \min_{i \in K}\max_{j \in C}((I_t(x, y) - \mu_{i,j})^2 - T_b \cdot \sigma^2)$$

where
   $I_t(x, y)$ is the value of a pixel;
   $T_b$ is said predetermined number of standard deviations;
   K is a variable denoting a number of Gaussian distributions $$\sigma = \sum_i^k \omega_i \sigma_i,$$

where
   $\omega_i$ is channel weight; and
   $\sigma_i$ is channel variance.

6. The method of claim 5, wherein the number of Gaussian models associated with each pixel is represented by:

$$K \times C$$

where C is the number of channels.

7. The method of claim 6, wherein a pixel is determined to match any said Gaussian in an image background model when it satisfies the criteria:

$$F_B(x, y) = \begin{cases} 1, & \text{if } D_{min}(x, y) > 0 \\ 0, & \text{otherwise} \end{cases}$$

and
   is determined to comprise foreground when is does not satisfy said criteria.

8. The method of claim 7, wherein said step of image foreground modeling further comprises the step of detecting static foreground within ambiguous foreground detections according to:

$$F_S(x, y) = \begin{cases} 1, & \text{if } F_{amb}(x, y) = 1 \text{ and} \\ & I_t(x, y) - \mu_f(x, y) < T_f \\ 0, & \text{otherwise} \end{cases}$$

where
   $F_S$ are static foreground regions;
   $F_{amb}$ are ambiguous detection regions; and
   $T_b$ is a predetermined number of standard deviations.

9. The method of claim 1, wherein said step of image background modeling further comprises the step of initializing said background model with a plurality of initial frames of said video images.

10. The method of claim 1, wherein said step of image foreground modeling further comprises the step of initializing said foreground model as empty.

11. The method of claim 1, wherein said step of image background modeling further comprises the step of background model updating, wherein said step of updating further comprises the steps of:
   updating said background model with static background and illumination changes;
   incorporating background revealed by removed objects and dynamic background into said background model as new Gaussian distributions;
   initializing said new Gaussians with high variance, low weight, and mean set to a current pixel value; and
   discarding Gaussians with weights less than a predetermined threshold.

12. The method of claim 1, wherein said step of image foreground modeling further comprises the step of foreground model updating, wherein said step of updating further comprises the steps of:
   updating said foreground model in those foreground regions indicated by an inverse of said background model update masks.

13. The method of claim 1, wherein said step of fusing further comprises the steps of:
   classifying as moving foreground objects those pixels which are detected as foreground by both said step of motion segmentation and said step of background subtraction; and
   classifying as static foreground objects those pixels which are detected as foreground by said step of background and which have a match in said foreground model.

14. The method of claim 1, wherein said step of discriminating among said static foreground objects further comprises the steps of:
   identifying those pixels corresponding to said static foreground objects;
   performing edge detection on said static foreground objects in current image;
   performing edge detection on background generated by background subtraction and foreground detection mask; and
   performing classification based on edge matching.

15. The method of claim 14, wherein said step of classification further comprises identifying:
   when a static object has a high edge similarity between said current image and said foreground detection mask; and
   when background revealed by object removal has a high edge similarity to said background model and said foreground detection mask.

16. A method for static and moving object detection from a source of video images comprised of pixels, said method comprising:
   associating a semantic label with each pixel that has been identified as having changed in said video image, wherein said step of associating further comprises the steps of:
   performing motion segmentation;
   performing background subtraction, wherein said background subtraction further comprises the steps of:
      modeling image background and modeling image foreground separately from each other, wherein said background modeling comprises an adaptive plurality of Gaussians;
   performing appearance agreement with an image foreground model, blob size, and object based analysis;
   fusing results of said motion segmentation, said background modeling, and said appearance agreement so as to associate each said changed pixel with an image category.

17. The method of claim 16, wherein said image category comprises any one of the following image categories:
   true moving object;
   stopped object;
   shadowing;
   illumination change;
   static background;
   background revealed upon a moved stationary object; and
   dynamic background due to constant motion.

18. The method of claim 16, wherein said step of fusing further comprises fusing image information selected from the group consisting of optical flow, texture information, shape information, and depth information.

* * * * *